United States Patent [19]
Yang

[11] Patent Number: 5,768,031
[45] Date of Patent: Jun. 16, 1998

[54] OBJECTIVE LENS

[75] Inventor: Keun Y. Yang, Kyungki-do, Rep. of Korea

[73] Assignee: LG Electronics Inc., Seoul, Rep. of Korea

[21] Appl. No.: 712,850

[22] Filed: Sep. 12, 1996

[30] Foreign Application Priority Data

Dec. 1, 1995 [KR] Rep. of Korea ............... 1995/46096

[51] Int. Cl.$^6$ ............... G02B 3/08; G02B 3/02
[52] U.S. Cl. ............... 359/708; 359/565
[58] Field of Search ............... 359/708, 709, 359/710, 711, 355, 356, 357, 565, 566, 569, 571, 900, 16, 19; 369/109, 44.23, 44.12, 112

[56] References Cited

U.S. PATENT DOCUMENTS 4,979,807  12/1990  Matsuoka ............... 359/708
5,349,471  9/1994  Morris et al. ............... 359/565
5,644,413  7/1997  Komma et al. ............... 359/19

OTHER PUBLICATIONS

"Dual focus optical head for 0.6mm and 1.2mm disks", Komma, Y. et al., SPIE, vol. 2338, Optical Data Storage, pp. 282–288, 1994.

Primary Examiner—Frank G. Font
Assistant Examiner—Michael P. Stafiro
Attorney, Agent, or Firm—Morgan, Lewis & Bockius LLP

[57] ABSTRACT

An objective lens having a first surface and a second surface, includes a first face formed on the first surface, a second face formed on the second surface, and a third face formed on one of the first and second surfaces. The first, second, and third faces are adapted in such a way that the objective lens has at least two focal lengths.

68 Claims, 11 Drawing Sheets

FIG.5A light source

OBJECTIVE LENS

BACKGROUND OF THE INVENTION

1. Field of the Invention

The present invention relates to an objective lens, and more particularly, to a single objective lens for an optical pickup.

2. Discussion of the Related Art

Strong demand for recording/playing back large amounts of information has led to the development of an optical device which utilizes optical signals to record/play back information. Recently, a super density SD optical recording medium whose capacity is six to seven times as large as that of the existing compact disk has been produced. A new optical pickup is required in order to read data recorded on the SD optical disk. An optical pickup is a device for reading out information from an optical disk such as a compact disk or a laser disk by laser and optical devices. Also, the new optical pickup needs to read out the existing 1.2 mm-thick CD type optical disk as well as the 0.6 mm-thick SD type optical disk.

A conventional optical pickup using the objective lens for this purpose will be described with reference to the attached drawing as follows.

Figure 1:
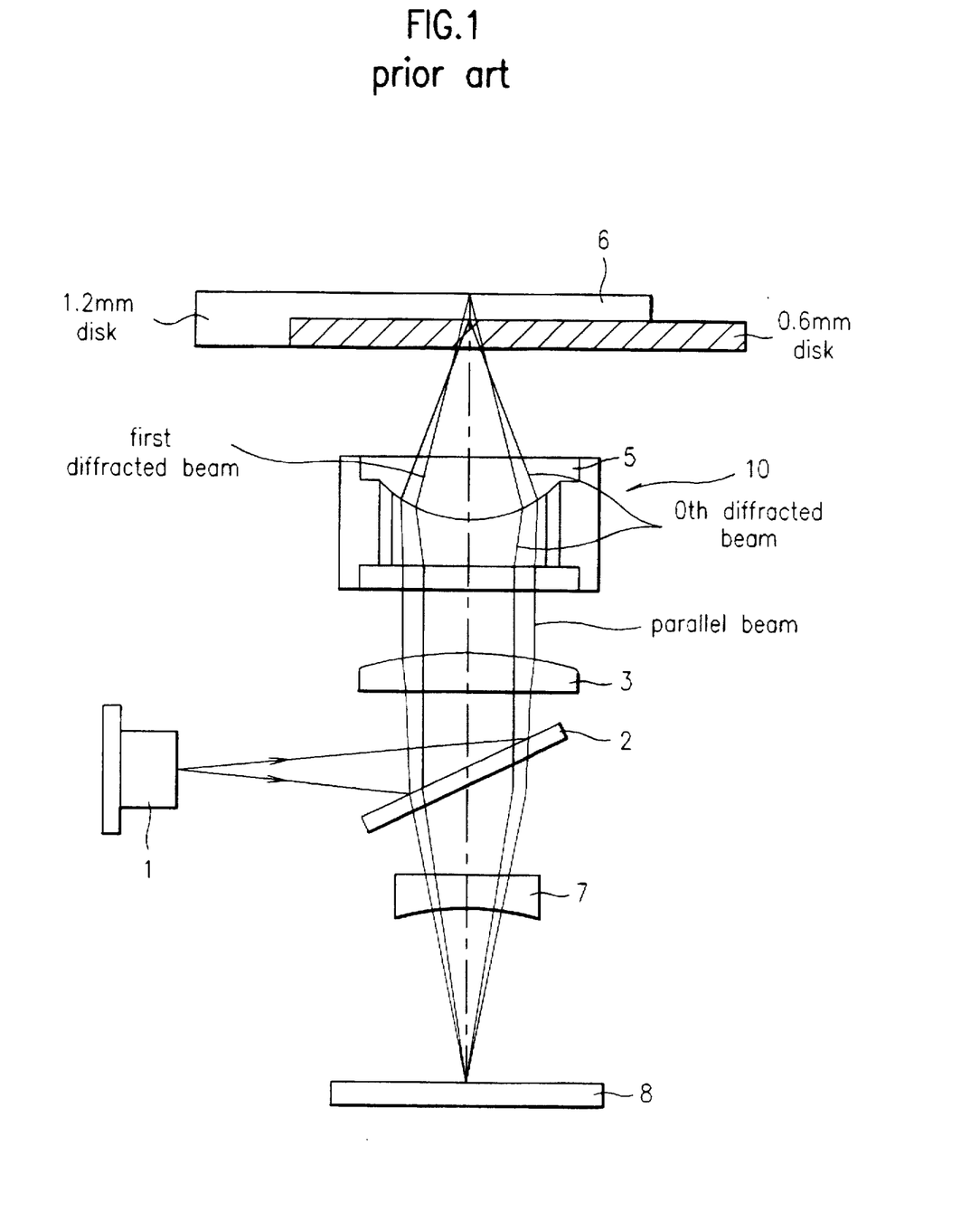
FIG. 1 illustrates an optical pickup using a conventional objective lens.

FIG. 1 is a schematic diagram of a conventional infinite optical pickup using an objective lens system. The conventional optical pickup has a laser diode 1 as a light source. A partially reflecting mirror 2 reflects a beam generated from the laser diode 1 toward a disk 6, and transmits a signal read out from the disk 6. A collimator 3 makes the beam reflected from the partially reflecting mirror 2 parallel. A hologram lens 4 converts the beam coming from the collimator 3 into 0th order and first order diffraction beams and guides them into an objective lens 5. The objective lens 5 focuses the beam which has passed through the hologram lens 4 on the disk 6 to read out a signal recorded on the disk 6. The signal read out from the disk 6 travels back along its incident path, through the objective lens 5, the hologram lens 4, the collimator 3, and the partially reflecting mirror 2. A converging lens 7 converges the signal which has passed through the partially reflecting mirror 2 on a photo detector 8. The photo detector 8 detects the signal converged by the converging lens 7. Also, although not shown in the figure, the optical pickup may be equipped with a servo for moving the object lens to keep the beam focused on the disk.

In this conventional optical pickup, the objective lens 5, together with the hologram lens 4, serves as an objective lens system which has two different foci. The beam generated from the laser diode 1, a light source, is reflected by the partially reflecting mirror 2, passes through the collimator 3 becoming parallel, and reaches the hologram lens 4. The hologram lens 4 uses the 0th order diffracted beam for reading 0.6 mm-thick disk, and the first order diffracted beam for 1.2 mm-thick disk.

First, in the case of the 0.6 mm disk, the beam transmitted through the hologram lens 4 without diffraction is focused onto the 0.6 mm disk through the objective lens 5. The signal read out from the disk is transmitted along the path of the objective lens 5, the hologram lens 4, the collimator 3, the partially reflecting mirror 2 and the converging lens 7. The beam is focused on the photo detector 8, and then the photo detector 8 detects and outputs the signal.

Similarly, the laser beam that is diffracted once through the hologram lens 4 is focused on the 1.2 mm disk 6 through the objective lens 5. The signal read out from the disk 6 in this way passes along the incidence path of the first order diffracted beam and is focused onto the photo detector 8. Then, the photo detector 8 detects and outputs the signal.

The conventional optical pickup has two different foci, one of which uses the 0th order diffracted beam of the hologram lens 4, and the other uses the first order diffracted beam of the hologram lens 4. Thus, it is possible to read out information from the 0.6 mm disk and the 1.2 mm disk.

However, the conventional objective lens used for the optical pickup has the following problems.

First, the wave length of the laser diode used for a light source in the conventional art varies according to the changes of the external environmental condition during the operation, such as a temperature variation. In the conventional art, the hologram lens is employed to generate two different foci. The diffraction angle of the first order diffraction beam is very sensitive to such changes of wave length, causing instability of the focal point originated from the first diffraction beam. As a result, the conventional art has difficulty in reading out the information from the disks under such changes of wave length.

Second, in the conventional art, when the laser beam is focused on the disk, the 0th order diffracted light of the hologram lens is used for reading out the SD type optical disk (thickness: 0.6 mm), and the +first order diffracted light of the hologram lens is used for reading out the CD type optical disk (thickness: 1.2 mm). Thus, some quantity of light is wasted, and difficulty in processing the signal arises as is described below.

The conventional art is disadvantageous for a recording medium which needs a higher power laser beam than a predetermined value for the purpose of reading out. Diffraction efficiencies determine the light loss. Suppose that the diffraction efficiency of the hologram is as follows: 0th order diffracted beam=50%, +first order diffracted beam=25%, −first order diffracted beam=25% (these are the diffraction efficiencies of a general hologram). When the laser beam reaches the objective lens system (objective lens+hologram lens), only 50% of the quantity of light of the incident laser beam is converged on the 0.6 mm disk and the other 50% is lost because the 0th order diffracted beam of the hologram lens is used.

The 50% beam reflected by the disk uses 0th order diffracted beam for analyzing the signal or driving a servo when passing through the objective lens again, so that half of the 50% beam is further lost. Thus, the loss of the quantity of light is 75% in total.

On the other hand, the +first order diffracted beam of the hologram is used to read out the 1.2 mm disk. In this case, only 25% of the incident laser beam is converged on the disk, and the other 75% is lost. Since the 25% beam reflected by the disk uses only 0th order diffracted beam for analyzing the signal or driving a servo when passing through the objective lens again, 12.5%, i.e., 50% of the 25% beam, is further lost. Thus, the loss of the quantity of light is 87.5% in total.

Even though the diffraction efficiency of the unused −first order diffracted beam can be reduced to 0% and therefore the diffraction efficiency of the +first diffracted beam increases to 50%, the loss of the quantity of light will still be 75% in the case of reading out the 0.6 mm disk, and will be reduced to merely 75% in the case of reading out the 1.2 mm disk. The technical material (SPIE Vol. 2338 optical data storage (1994)), however, shows that the hologram lens, with the 50% diffraction efficiency of +first order diffracted beam, is almost impossible to manufacture. Therefore, the above values for loss of light is the theoretically optimal estimation. Nonetheless, the intensity of the optical signal detected from the photo detector under such conditions is not strong enough to read out the 0.6 mm disk and 1.2 mm disk with precision. Moreover, the intensity of the optical signal varies with the disks. This causes the further difficulty in analyzing and processing the signal.

Third, in the case of constructing the finite system optical pickup in the conventional art, the interval of an interference pattern recorded in the hologram lens must be less than about 1 mm, too narrow to manufacture. The narrower the interval of the interference pattern is, the more the hologram is sensitive to the wavelength changes of the laser diode. Therefore, the servo operation according to the wave length change malfunctions.

Fourth, the weight of the objective lens system should be small to read out information at high speed. In the conventional optical pickup, however, the hologram lens is added to the objective lens, and therefore increases the weight of the total objective lens system. For this reason, the conventional optical pickup is disadvantageous in reading out at high speed.

SUMMARY OF THE INVENTION

Accordingly, the present invention is directed to an objective lens that substantially obviates one or more of the problems due to limitations and disadvantages of the related art.

An object of the invention is to provide a single objective lens which is capable of reading out an SD type disk and a general CD.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the objective lens includes at least three spherical surfaces or aspherical surfaces on both surfaces of the lens, having at least two different focal lengths with a curvature radius and an aspherical coefficient.

In another aspect, the object lens includes aspherical surfaces on both surfaces of the lens, wherein aspherical surfaces having at least two different curvature radii and aspherical coefficients are formed on one curved surface of the lens facing an optical disk, and an aspherical surface having a curvature radius and an aspherical coefficient is formed on the other curved surface facing a light source, to thereby have at least two focal points.

In a further aspect, the objective lens includes different aspherical surfaces on both surfaces, wherein an aspherical surface having a predetermined curvature radius and an aspherical coefficient is formed on a curved surface of the lens facing an optical disk, and aspherical surfaces having at least two curvature radii and aspherical coefficients are formed on the other curved surface facing a light source, to thereby have at least two different focal points.

In a further aspect, the objective lens includes different aspherical surfaces on both surfaces, wherein aspherical surfaces having at least two curvature radii and aspherical coefficients are formed on a curved surface of the lens facing an optical disk, and aspherical surfaces having at least two curvature radii and aspherical coefficients are formed on the other curved surface facing a light source, to thereby have at least two different focal points.

In a further aspect, the objective lens includes spherical surfaces and an aspherical surface, wherein spherical surfaces having at least two different curvature radii are formed on one curved surface of the lens facing an optical disk, and an aspherical surface having a curvature radius and an aspherical coefficient is formed on the other curved surface facing a light source, to thereby have at least two focal points.

In a further aspect, the objective lens includes a spherical surface and aspherical surfaces, wherein a spherical surface having a predetermined curvature radius is formed on a curved surface of the lens facing an optical disk, and aspherical surfaces having at least two curvature radii and aspherical coefficients are formed on the other curved surface facing a light source, to thereby have at least two different focal points.

In a further aspect, the objective lens includes spherical surfaces and aspherical surfaces, wherein spherical surfaces having at least two different curvature radii are formed on one curved surface of the lens facing an optical disk, and aspherical surfaces having at least two different curvature radii and aspherical coefficients are formed on the other curved surface facing a light source, to thereby have at least two focal points.

In a further aspect, the objective lens includes aspherical surfaces and a spherical surface, wherein aspherical surfaces having at least two different curvature radii and aspherical coefficients are formed on one curved surface of the lens facing an optical disk, and a spherical surface having a curvature radius is formed on the other curved surface facing a light source, to thereby have at least two focal points.

In a further aspect, the objective lens includes an aspherical surface and spherical surfaces, wherein an aspherical surface having a predetermined curvature radius and an aspherical coefficients is formed on a curved surface of the lens facing an optical disk, and spherical surfaces having at least two curvature radii are formed on the other curved surface facing a light source, to thereby have at least two different focal points.

In a further aspect, the objective lens includes aspherical surfaces and spherical surfaces, wherein aspherical surfaces having at least two different curvature radii and aspherical coefficients are formed on one curved surface of the lens facing an optical disk, and spherical surfaces having at least two different curvature radii are formed on the other curved surface facing a light source, to thereby have at least two focal points.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 2A:
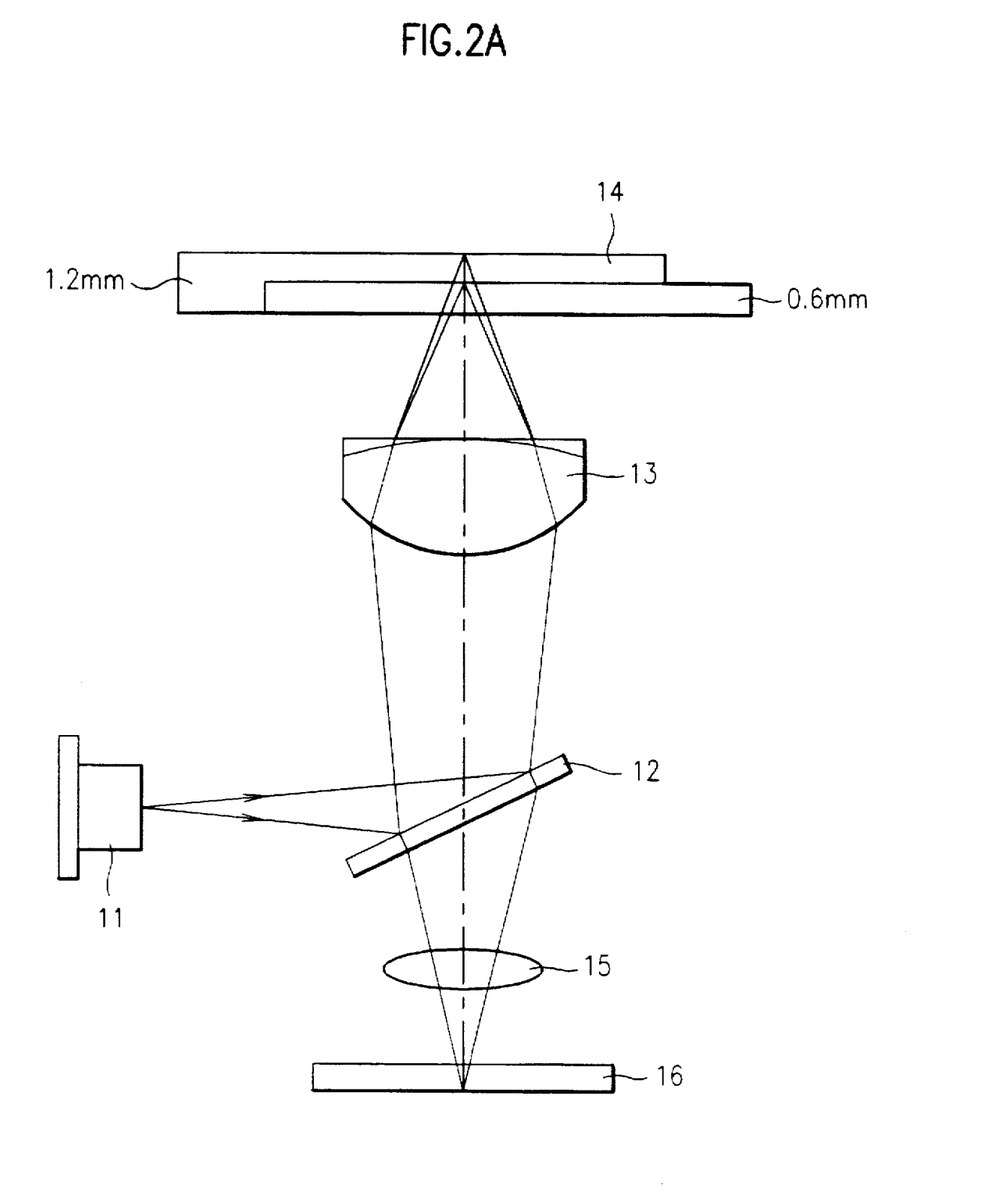
FIGS. 2A and 2B illustrate an optical pickup using an objective lens of the invention.
Figure 2B:
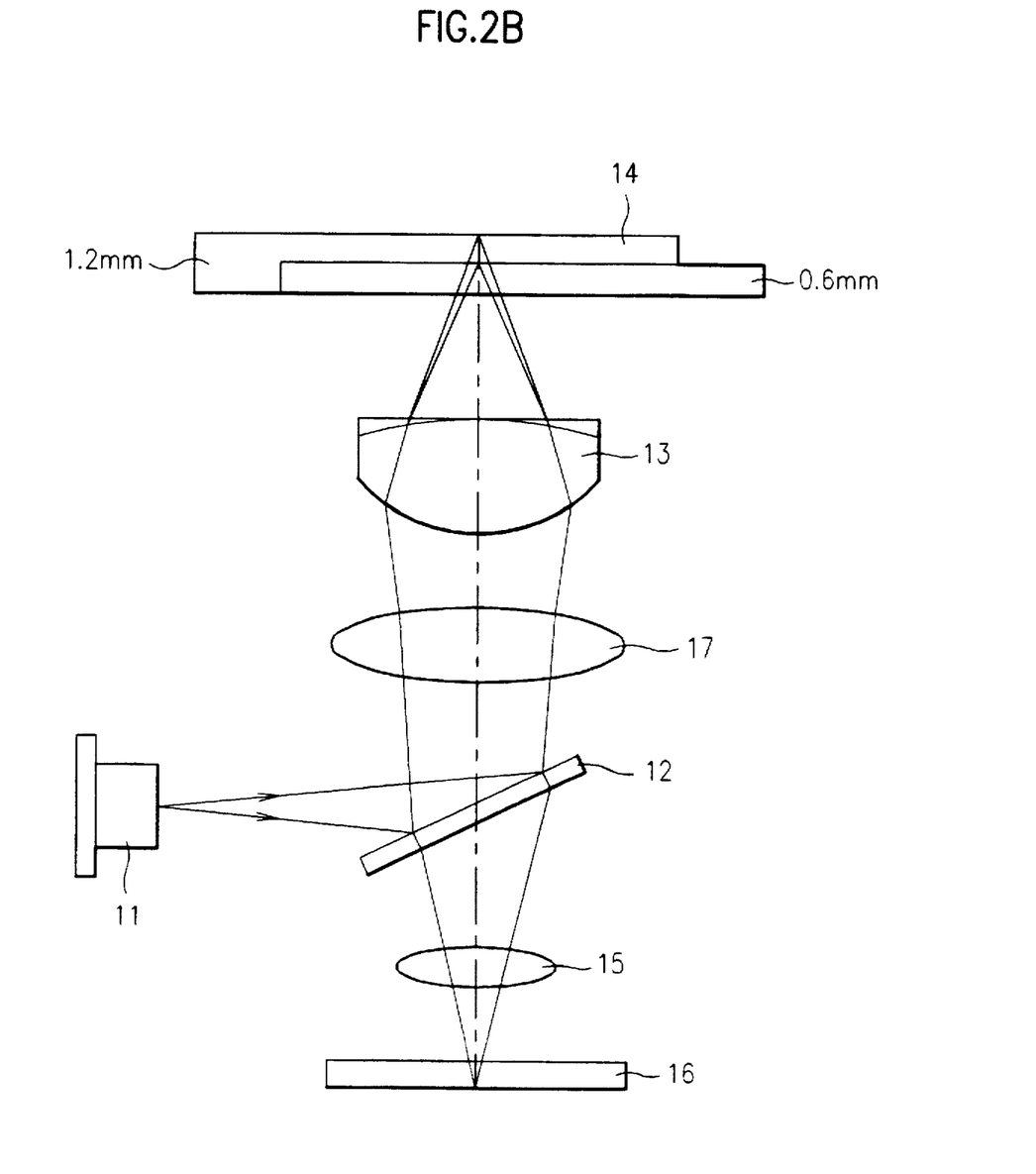

FIG. 2A shows a finite optical pickup using an objective lens of the invention, whereas FIG. 2B is an infinite optical pickup using the same.

As illustrated in FIG. 2A, the finite system optical pickup using the objective lens includes a laser diode 11 as a light source. A partially reflecting mirror 12 reflects a beam generated from the laser diode 11 toward a disk 14 (optical storage), and transmits a signal read from the optical storage. An objective lens 13 focuses a beam reflected by the partially reflecting mirror 12 onto two focal points. A converging lens 15 converges the signal which has passed through the partially reflecting mirror 12 on a photo detector 16. The photo detector 16 measures and detects the beam coming from the converging lens 15.

As illustrated in FIG. 2B, the infinite system optical pickup using an objective lens of the invention includes a collimator 17 between a partially reflecting mirror 12 and objective lens 13. Through the collimator 17, the laser beam reflected by the partially reflecting mirror 12 becomes parallel. The other components are the same as those in the finite system optical pickup in FIG. 2A.

Figure 3A:
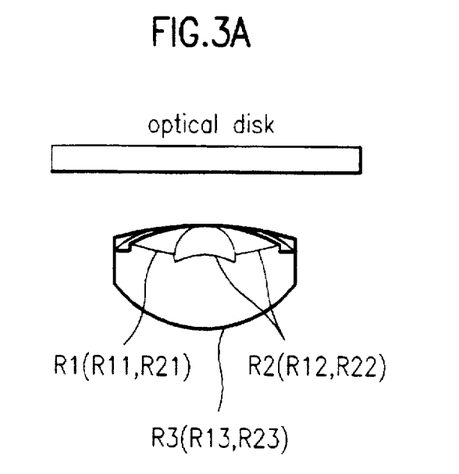
FIGS. 3A, 3B, and 3C illustrate a first embodiment of an objective lens of the invention, in which two types of spherical faces are radially formed on one surface facing an optical disk.
Figure 3B:
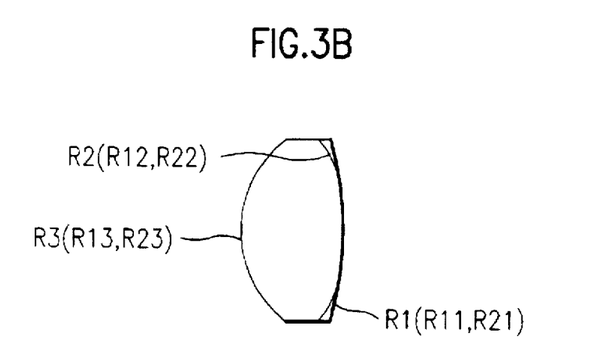
Figure 3C:
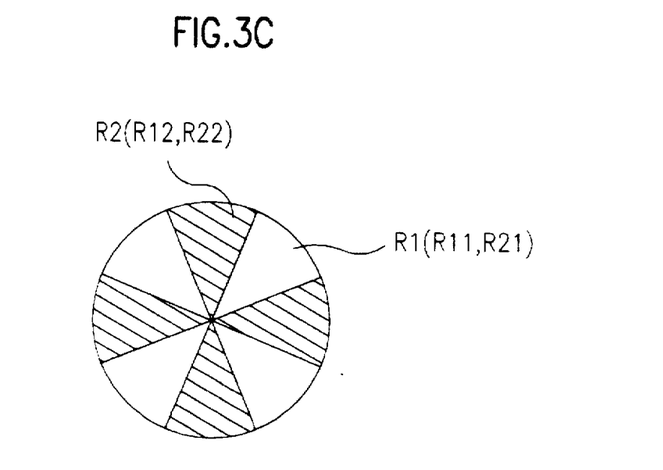
Figure 4A:
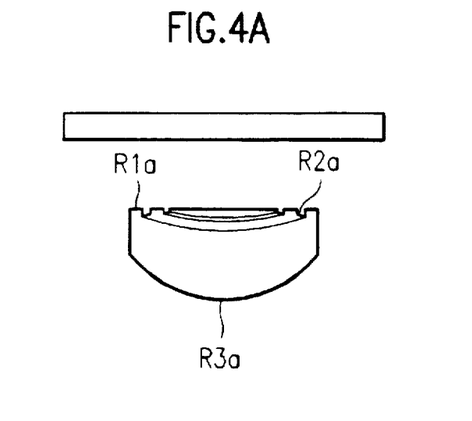
FIGS. 4A, 4B, and 4C illustrate a modification of the first embodiment of the object lens of the invention, in which two types of spherical faces are annularly formed on one surface facing the optical disk.
Figure 4B:
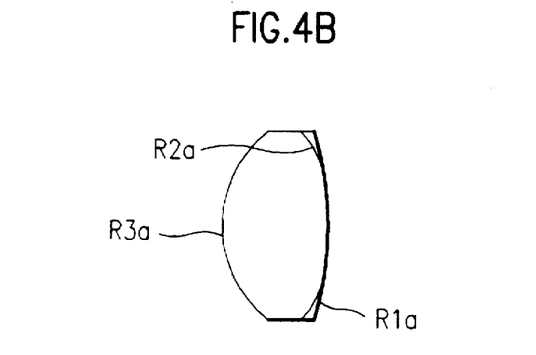
Figure 4C:
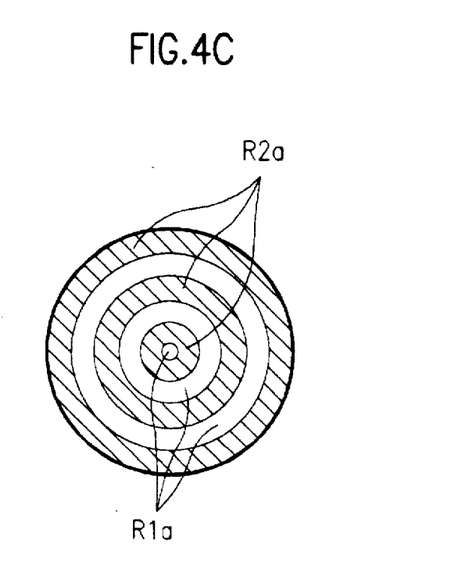

FIGS. 3A to 3C and 4A to 4C illustrate a first embodiment of the invention. FIGS. 3A to 3C illustrate an objective lens in which two curved faces different in curvature are alternately formed in a radial manner on one surface of the lens facing the optical disk. FIGS. 4A to 4C illustrate the objective lens in which two curved faces, different in curvature are alternately formed, in the shape of circles, on one surface facing the optical disk. In this figure, (A) is a front view of the objective lens; (B) is the side view; and (C) is the plan view.

In the first embodiment of the invention, both surfaces of the lens have different aspherical faces. In general, an aspherical face is specified by the curvature radius and the aspherical coefficient. The aspherical faces having two different curvature radii R1 and R2 and aspherical coefficients are formed radially in FIGS. 3A to 3C and annularly in FIGS. 4A to 4C, on the surface facing the optical disk. The aspherical face having a curvature radius R3 and an aspherical coefficient are formed on the other surface facing toward the light source. Their curvature radii satisfy the condition of R1>R3, R2>R3 (R1a>R3a, R2a>R3a in FIGS. 4A to 4C).

Figure 5A:
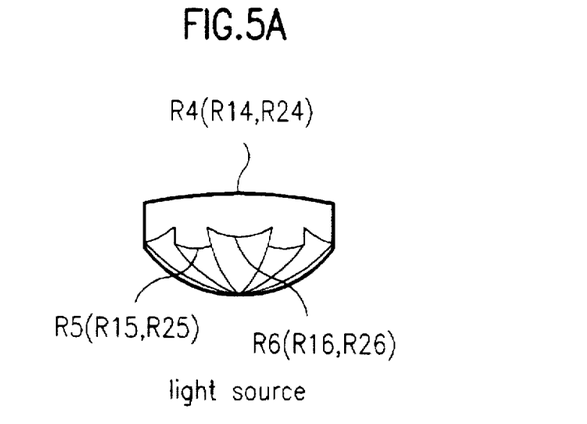
FIGS. 5A, 5B, and 5C illustrate a second embodiment of the objective lens of the invention, in which two types of spherical faces are radially formed on one surface facing to the light source.
Figure 5B:
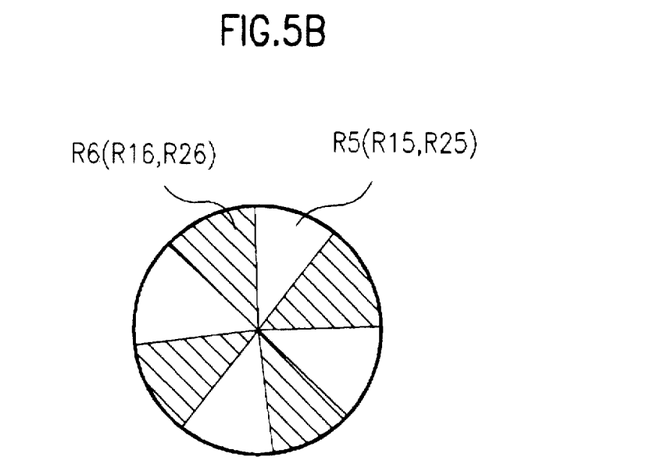
Figure 5C:
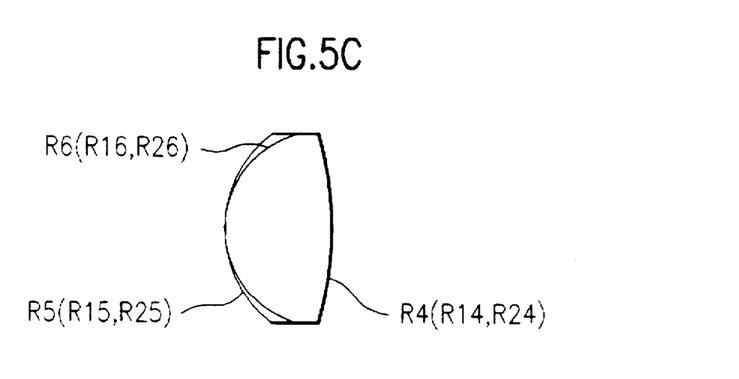
Figure 6A:
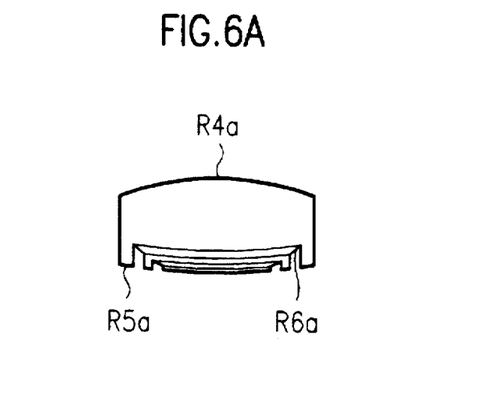
FIGS. 6A, 6B, and 6C illustrates a modification of the second embodiment of the objective lens of the invention, in which two types of spherical faces are annularly formed on one surface facing to the light source.
Figure 6B:
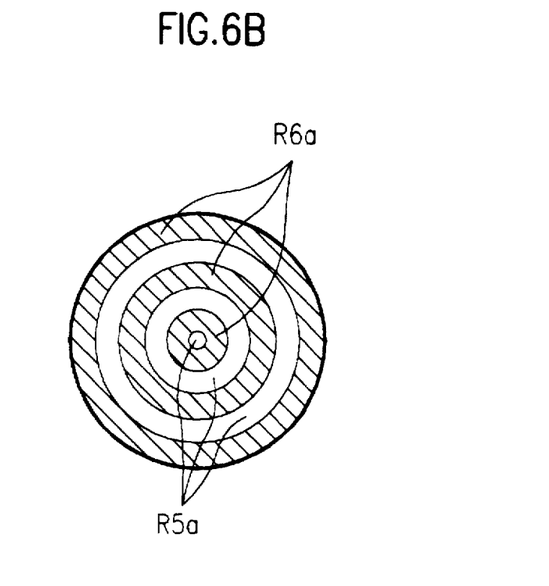
Figure 6C:
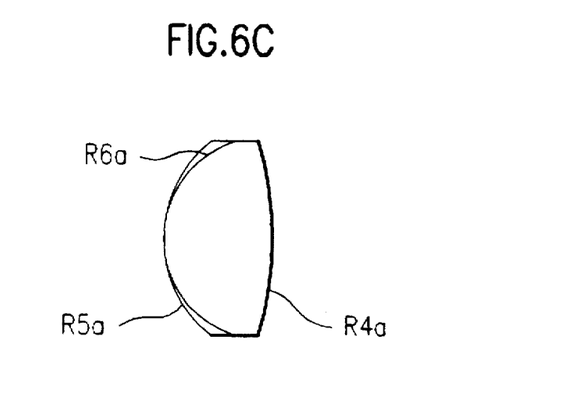
Figure 7A:
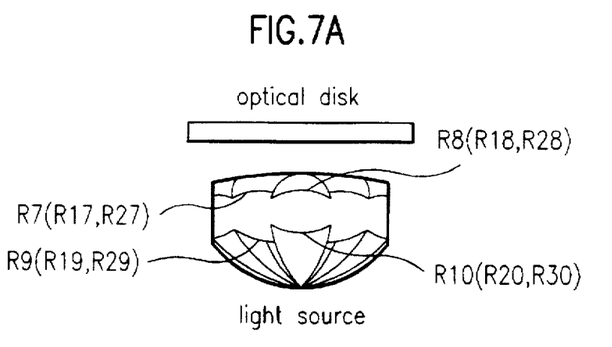
FIGS. 7A, 7B, 7C, and 7D illustrate a third embodiment of the objective lens of the invention in which two types of spherical surfaces are radially formed on both surfaces facing the optical disk and light source.
Figure 7B:
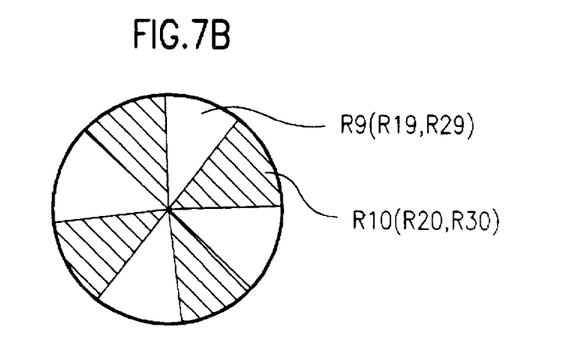
Figure 7C:
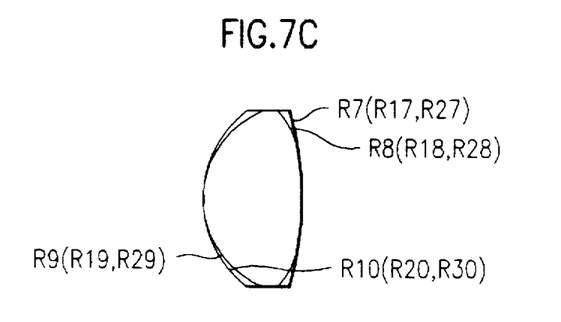
Figure 7D:
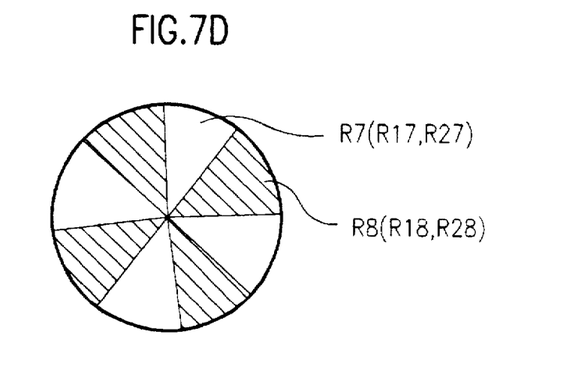
Figure 8A:
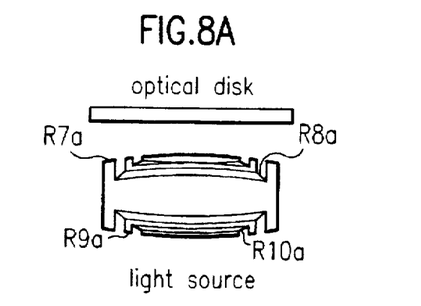
FIGS. 8A, 8B, 8C, and 8D illustrate a modification of the third embodiment of the objective lens of the invention, in which two types of spherical surfaces are annularly formed on both surfaces facing the optical disk and light source.
Figure 8B:
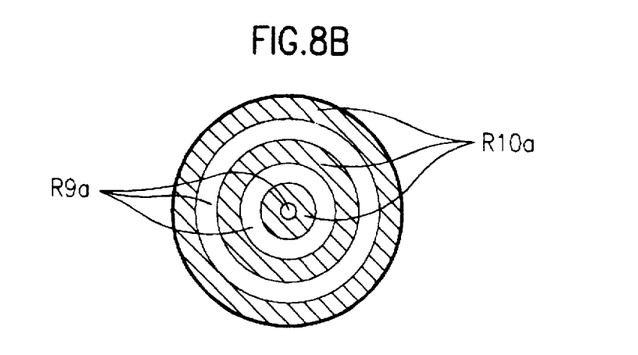
Figure 8C:
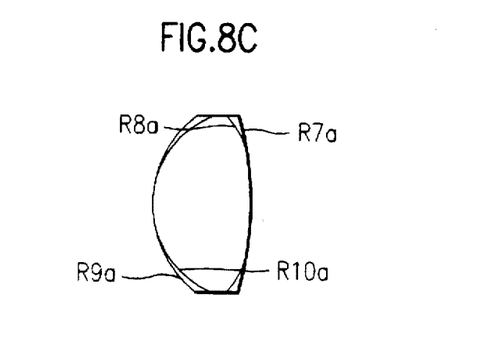
Figure 8D:
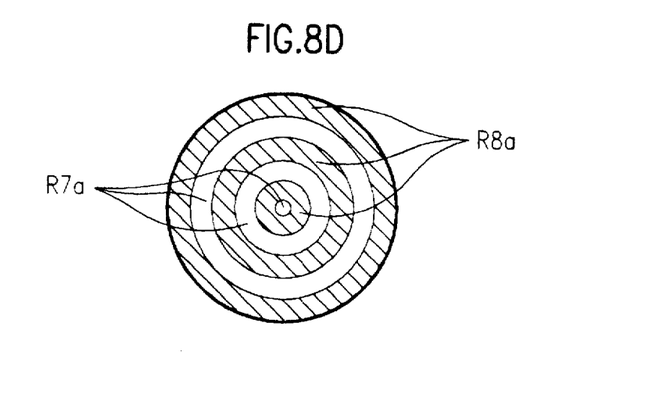

FIGS. 5A to 5C and 6A to 6C illustrate a second embodiment of the invention. FIGS. 5A to 5C illustrate an objective lens in which two types of curved faces different in curvature are alternately formed in a radial manner on the surface facing toward the light source. FIGS. 6A to 6C illustrate an object lens in which two types of curved faces different in curvature are alternately formed in the shape of circles on the surface facing toward the light source. In this figure, (A) is a front view of the objective lens; (B) is the side view; and (C) is the plan view.

In the second embodiment of the invention, both surfaces of the lens have different aspherical faces. On the surface facing the optical disk, an aspherical face with a curvature radius R4 and an aspherical coefficient is formed. On the other surface facing toward the light source, aspherical faces which have different curvature radii R5 and R6 and aspherical coefficients are formed radially in FIGS. 5A to 5C and annularly in FIGS. 6A to 6C. Their curvature radii satisfy the condition of R4>R5, R4>R6 (R4a>R5a, R4a>R6a in FIGS. 6A to 6C).

FIGS. 7A to 7D and 8A to 8D illustrate the object lens according to a third embodiment of the invention. FIGS. 7A to 7D illustrate the objective lens, in which two types of curved faces, different in curvature, are alternately formed in a radial manner on both surfaces: one facing the optical disk, the other facing toward the light source. FIGS. 8A to 8D illustrate the objective lens, in which two types of curved faces, different in curvature, are alternately formed on the both surfaces of the objective lens in the shape of circles. In this figure (A) is a front view; (B) and (D) are plan views; and (C) is a side view.

In the third embodiment of the invention, each surfaces of the lens has different aspherical faces. Two aspherical faces having the different curvature radii R7 and R8 and aspherical coefficients are alternately formed on the surface facing the optical disk. The aspherical faces having two different curvature radii R9 and R10 and aspherical coefficients are alternately formed on the other surface facing toward the light source. The faces are radially formed in FIGS. 7A to 7D, and annularly formed in FIGS. 8A to 8D. The faces on one side are positioned to match the faces on the other surface. Their curvature radii satisfy the conditions of R7>R9, R7>R10, R8>R9, and R8>R10 (That is, R7a>R9a, R7a>R10a, R8a>R9a, and R8a>R10a). The objective lens according to a fourth embodiment of the invention has a similar structure to the first embodiment illustrated in FIGS. 3A to 3C and 4A to 4C. Here, spherical faces having two different curvature radii R11 and R12 are formed on the surface facing the optical disk, radially or annularly. An aspherical surface having a curvature radius R13 and an aspherical coefficient is formed on the other surface facing toward the light source. Their curvature radii satisfy the conditions of R11>R13, and R12>R13.

That is, in the objective lens according to the fourth embodiment of the invention, the faces of the lens facing the optical disk are spherical, and other construction thereof is the same as that of the first embodiment shown in FIGS. 3A to 3C and 4A to 4C.

The objective lens according to a fifth embodiment of the invention has a similar structure to the second embodiment illustrated in FIGS. 5A to 5C and 6A to 6C. Here, a spherical surface having a curvature radius R14 is formed on the surface of the lens facing the optical disk. Aspherical faces having two different curvature radii R15 and R16 and aspherical coefficients are formed radially or annularly on the other surface facing toward the light source. Their curvature radii satisfy the conditions of R14>R15, and R14>R16.

That is, in the objective lens according to the fifth embodiment of the invention, the face of the lens facing the optical disk is spherical, and other construction are the same as that of the second embodiment shown in FIGS. 5A to 5C and 6A to 6C.

The objective lens according to a sixth embodiment of the invention has a similar structure to the third embodiment illustrated in FIGS. 7A to 7D and 8A to 8D. Here, spherical faces having two different curvature radii R17 and R18 are alternately formed on the surface facing the optical disk in a radial manner or in the shape of circles. Aspherical faces having two different curvature radii R19 and R20 and aspherical coefficients are alternately formed on the other surface facing the light source in a radial manner or in the shape of circles. The faces on one surface are positioned to match the faces on the other surface. Their curvature radii satisfy the condition of R17>R19, R17>R20, R18>R19, and R18>R20.

That is, in the objective lens according to the sixth embodiment of the invention, the faces of the lens facing the light source are spherical, and other construction are the same as that of the third embodiment shown in FIGS. 7A to 7D and 8A to 8D.

The objective lens according to a seventh embodiment of the invention has a similar structure to the first embodiment illustrated in FIGS. 3A to 3C and 4A to 4C. Aspherical faces having two different curvature radii R21 and R22 are alternately formed on the surface facing the optical disk in a radial manner or in the shape of circles. A spherical face having a curvature radius R23 is formed on the other surface facing toward the light source. Their curvature radii satisfy the conditions of R21>R23 and R22>R23.

That is, in the objective lens according to the seventh embodiment, the face of the lens facing toward the light source is spherical, and other construction are the same as that of the first embodiment shown in FIGS. 3A to 3C and 4A to 4C.

The objective lens according to an eighth embodiment of the invention has a similar structure to the second embodiment illustrated in FIGS. 5A to 5C and 6A to 6C. An aspherical face having a curvature radius R24 and aspherical coefficient is formed on the surface of the lens facing the optical disk. Spherical surfaces having different curvature radii R25 and R26 are alternately formed on the other surface facing toward the light source in a radial manner or in the shape of circles. Their curvature radii satisfy the conditions of R24>R25 and R24>R26.

That is, in the objective lens according to the eighth embodiment, the face of the lens facing the light source is spherical, and other construction thereof is the same as that of the second embodiment shown in FIGS. 5A to 5C and 6A to 6C.

The objective lens according to the ninth embodiment of the invention has a similar structure to that of the third embodiment illustrated in FIGS. 7A to 7D and 8A to 8D. Aspherical faces having two different curvature radii R27 and R28 and aspherical coefficients are alternately formed on the surface facing the optical disk, radially or annularly. Spherical faces having two different curvature radii R29 and R30 are alternately formed on the other surface facing toward the light source, radially or annularly. The faces on one surface are positioned to match the faces on the other surface. Their curvature radii satisfy the conditions of R27>R29, R27>R30, R28>R29, and R28>R30.

That is, in the objective lens according to the ninth embodiment, the faces of the lens facing toward the light source are spherical, and other construction are the same as that of the third embodiment shown in FIGS. 7A to 7D and 8A to 8D.

Figure 9A:
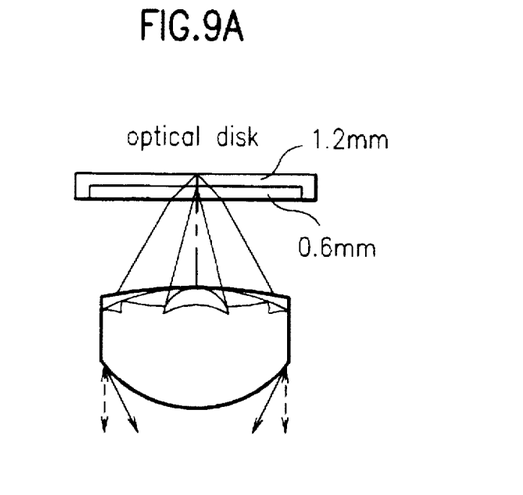
FIGS. 9A, 9B, and 9C illustrate cases in which two focal points are formed according to two types of the objective lens of the invention.
Figure 9B:
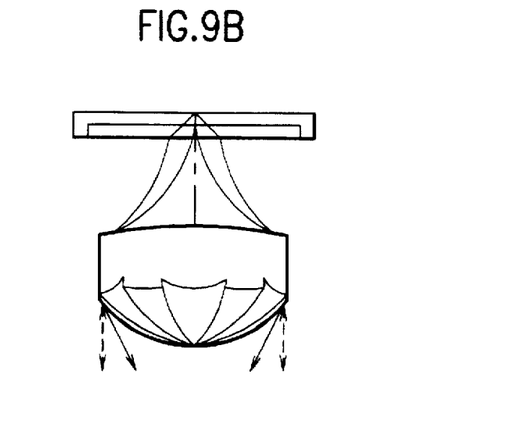
Figure 9C:
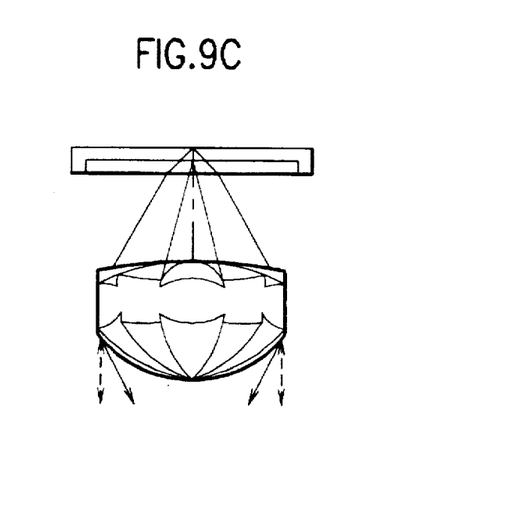

The operation and effects of these embodiments will be described as follows. The objective lens in each of the above-mentioned nine embodiments has one or more faces which are either aspherical or spherical on each surface of the lens, and has at least three such faces in total. Thus, as illustrated in FIGS. 9A to 9C, when a parallel or diverging laser beam reaches the objective lens, the laser beam is converged on two different focal points.

For instance, in the case of FIGS. 3A to 3C and 4A to 4C, a first lens is constructed from two lenses; one from the combination of R1 and R3 and the other from the combination of R2 and R3. These two lenses are combined in a single objective lens as illustrated in FIG. 9A, so that the focus of the first lens with combined R1 and R3 and the focus of the lens with combined R2 and R3 are different. Therefore, the laser beam properly converges on the 0.6 mm-thick SD standardized optical disk and the 1.2 mm-thick optical disk for a compact disk. Thus, two types of optical disks can be read by using a single objective lens.

In the case of FIGS. 5A to 5C and 6A to 6C, an objective lens is constructed from two lenses: one from the combination of R4 and R5 and the other from the combination of R4 and R6. Accordingly, the objective lens has two different focal lengths as illustrated in FIG. 9B.

In the case of FIGS. 7A to 7D and 8A to 8D, an objective lens is constructed from two lenses: one from the combination of R7 and R9, and the other from the combination of R8 and R10. Accordingly, the objective lens has two different focal lengths as illustrated in FIG. 9C.

In the aforementioned nine types of objective lens, the curvature radius and coefficient are set for the case that the distance from an object is constant and the distance from the image changes according to the two types of optical disks. The laser beam generated from the light source, a laser diode 11, is properly converged on the 0.6 mm-thick and 1.2 mm-thick optical disk. Therefore, it becomes possible to construct a finite system optical pickup or an infinite system optical pickup which is capable of reading two types of optical disks with one photo detector 16.

The objective lens of the invention is formed in a manner that the curved faces having different curvature radii and aspherical coefficients are formed on either or both of the surfaces of the lens in order to have two foci. A laser beam is used for reading out both the 0.6 mm-thick disk and the 1.2 mm-thick disk, so that part of the light amount of the laser beam incident on the objective lens is still lost. In FIGS. 3A to 3C, the combination of R1 and R3 is used for converging the laser beam onto the 1.2 mm-thick disk, and the combination of R2 and R3 is used for converging the laser beam onto the 0.6 mm-thick disk. If the area of the objective lens 13 occupied by the curved face having the curvature R1 is equal to that for R2, only 50% of the laser beam incident on the objective lens is used for reading each disk. However, no part of the 50% laser beam reflected by the disk is lost when the laser beam passes through the objective lens again. This is because the reflected laser beam passes through the same curved faces of the objective lens as it passed through the first time. Consequently, the amount of light lost during the steps of the laser beam reaching the objective lens 13, being reflected by the disk 14 and then passing through the objective lens 13, is 50% in total. The technology of the invention for reading a 0.6 mm-thick disk and a 1.2 mm-thick disk, as described above, sacrifices a much smaller amount of light, for both kinds of disks than the conventional art.

In a compact disk, the distance between tracks is 1.6 µm, and the shortest length and width of a pit on the disk are 0.9 µm and 0.5 µm, respectively. Thus, the compact disk can be read out by a 1.0–1.2 µm spot sized laser beam. On the other hand, a SD type disk has, for example, the track distance of 0.74 µm and the shortest pit length of 0.4 µm. In this case, a 0.7–0.8 µm spot sized laser beam is necessary to read out the disk.

Figure 10A:
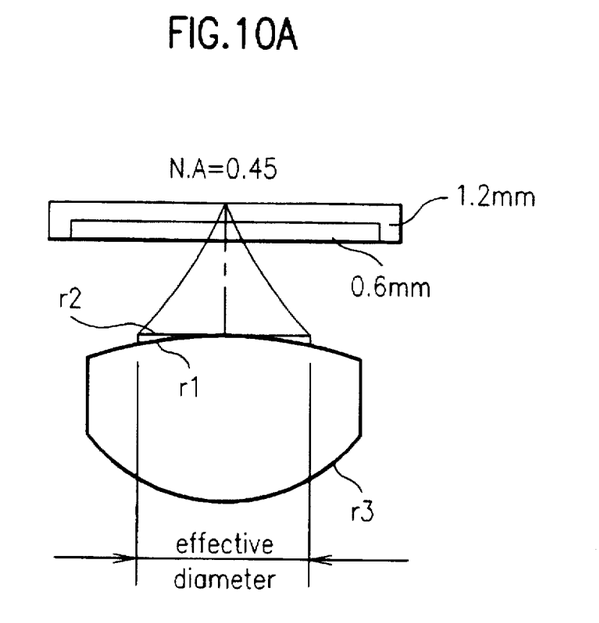
FIGS. 10A and 10B illustrate the numerical aperture of the lens of the invention through which light is converged on optical disks different in thickness.
Figure 10B:
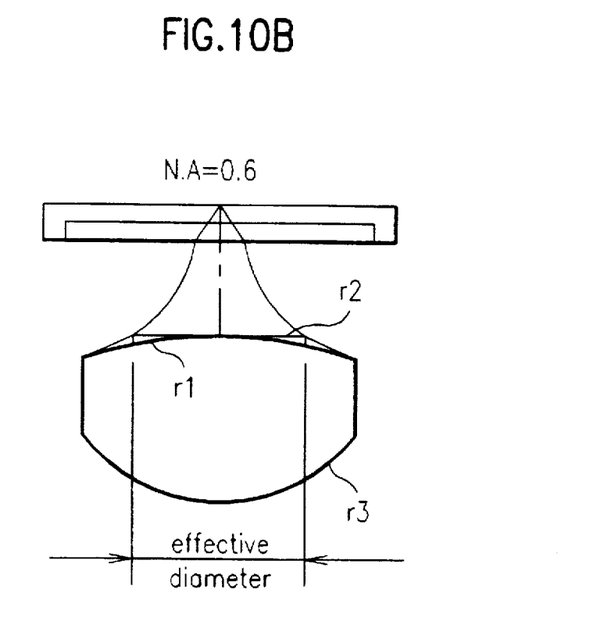

A numerical aperture (N.A.) represents a focusing power of a lens, and ranges from 0 to 1. The larger the value is, the more resolution the lens has. Currently, the objective lens for reading out a compact disk has a numerical aperture of 0.45 for forming a 1.0–1.2 µm spot size. The numerical aperture of the objective lens for reading out a SD type disk needs to be about 0.6 to form a 0.7–0.8 µm spot size. Also, the numerical aperture increases as the effective diameter increases or the converging length decreases. Therefore, the objective lens of the invention can converge the laser beam onto both disks by varying the effective diameter and converging length of the curved face of curvature radius (r1) and those of the curved face of curvature radius (r2) as illustrated in FIGS. 10A to 10B. That is, for the disk used for CD which requires 0.45 N.A., the laser beam is converged by the curved face of the curvature radius (r2), whose effective diameter is small and converging length is long as illustrated in FIG. 10A. For the disk used for SD which requires 0.6 N.A., the laser beam is converged by the curved face of the curvature radius (r1), whose effective diameter is large and converging length is short as illustrated in FIG. 10B, thereby properly converging the laser beam into both disks.

According to the foregoing description, the objective lens of the invention has one or more faces which are either spherical or aspherical on each surface of the lens, and has at least three such faces in total. The curvature radius and the aspherical coefficient of these faces are set for the case the distance of the object is constant and the distance of the image changes according to the two standards of optical disks. Therefore, the laser beam generated from the laser diode, the light source, is properly converged on the 0.6 mm-thick and 1.2 mm-thick optical disk.

It will be apparent to those skilled in the art that various modifications and variations can be made in the objective lens of the present invention without departing from the spirit or scope of the invention. Thus, it is intended that the present invention cover the modifications and variations of this invention provided they come within the scope of the appended claims and their equivalents.

What is claimed is:

1. An objective lens having a first surface on one side and a second surface on the other side, the objective lens comprising; a first face formed on the first surface, a second face formed on the second surface, and a third face formed on one of the first and second surfaces, wherein the first, second, and third faces are adapted in such a way that the objective lens has at least two different focal points.

2. An objective lens for reading out an optical disk by using a light source, having a first surface facing the optical disk and a second surface facing toward the light source, comprising; a first aspherical face formed on the first surface and specified by a curvature radius and an aspherical coefficient, a second aspherical face formed on the first surface and specified by a curvature radius and an aspherical coefficient which are different from those of the first aspherical face, and a third aspherical face formed on the second surface and specified by a curvature radius and an aspherical coefficient, wherein the first, second, and third aspherical faces are adapted in such a way that the objective lens has at least two different focal points.

3. An objective lens of claim 2, wherein the first and second aspherical faces are radially formed.

4. An objective lens of claim 2, wherein the first and second aspherical faces are annularly formed.

5. An objective lens of claim 2, wherein the area of the first aspherical face is equal to that of the second aspherical face.

6. An objective lens of claim 2, wherein the area of the first aspherical face is different from that of the second aspherical face.

7. An objective lens of claim 2, wherein the curvature radii of the first and second aspherical faces are each larger than the curvature radius of the third aspherical face.

8. An objective lens of claim 3, wherein an effective diameter of the first aspherical face is different from that of the second aspherical face so that numerical apertures for the focal points differ.

9. An objective lens for reading out an optical disk by using a light source, having a first surface facing the optical disk and a second surface facing toward the light source, comprising; a first aspherical face formed on the second surface and specified by a curvature radius and an aspherical coefficient, a second aspherical face formed on the second surface and specified by a curvature radius and an aspherical coefficient which are different from those of the first aspherical face, and a third aspherical face formed on the first surface and specified by a curvature radius and an aspherical coefficient, wherein the first, second, and third aspherical faces are adapted in such a way that the objective lens has at least two different focal points.

10. An objective lens of claim 9, wherein the first and second aspherical faces are radially formed.

11. An objective lens of claim 9, wherein the first and second aspherical faces are annularly formed.

12. An objective lens of claim 9, wherein the area of the first aspherical face is equal to that of the second aspherical face.

13. An objective lens of claim 9, wherein the area of the first aspherical face is different from that of the second aspherical face.

14. An objective lens of claim 9, wherein the curvature radius of the third aspherical face is larger than each of curvature radii of the first and second aspherical faces.

15. An objective lens of claim 10, wherein an effective diameter of the first aspherical face is different from that of the second aspherical face so that numerical apertures for the focal points differ.

16. An objective lens for reading out an optical disk by using a light source, having a first surface facing the optical disk and a second surface facing toward the light source, comprising; a first aspherical face formed on the first surface and specified by a curvature radius and an aspherical coefficient, a second aspherical face formed on the first surface and specified by a curvature radius and an aspherical coefficient which are different from those of the first aspherical face, a third aspherical face formed on the second surface and specified by a curvature radius and an aspherical coefficient, and a fourth aspherical face formed on the second surface and specified by a curvature radius and an aspherical coefficient which are different from those of the third aspherical face, wherein the first, second, third, and fourth aspherical faces are adapted in such a way that the objective lens has at least two focal points.

17. An objective lens of claim 16, wherein the first, second, third, and fourth aspherical faces are radially formed.

18. An objective lens of claim 16, wherein the first, second, third, and fourth aspherical faces are annularly formed.

19. An objective lens of claim 16, wherein the area of the first aspherical face is equal to that of the second aspherical face, and the area of the third aspherical face is equal to that of the fourth aspherical face.

20. An objective lens of claim 16, wherein the area of the first aspherical face is different from that of the second aspherical face, and the area of the third aspherical face is different form that of the fourth aspherical face.

21. An objective lens of claim 16, wherein the curvature radii of the first and second aspherical faces are each larger than each of the curvature radii of the third and fourth aspherical faces.

22. An objective lens of claim 17, wherein an effective diameter of the first aspherical face is different from that of the second aspherical face so that numerical apertures for the focal points differ.

23. An objective lens for reading out an optical disk by using a light source, having a first surface facing the optical disk and a second surface facing toward the light source, comprising; a first spherical face formed on the first surface and specified by a curvature radius, a second spherical face formed on the first surface and specified by a curvature radius which is different from that of the first spherical face, and an aspherical face formed on the second surface and specified by a curvature radius and an aspherical coefficient, wherein the first and second spherical faces and the aspherical faces are adapted in such a way that the objective lens has at least two different focal points.

24. An objective lens of claim 23, wherein the first and second spherical faces are radially formed.

25. An objective lens of claim 23, wherein the first and second spherical faces are annularly formed.

26. An objective lens of claim 23, wherein the area of the first spherical face is equal to that of the second spherical face.

27. An objective lens of claim 23, wherein the area of the first spherical face is different from that of the second spherical face.

28. An objective lens of claim 23, wherein the curvature radii of the first and second spherical faces are each larger than the curvature radius of the aspherical face.

29. An objective lens of claim 24, wherein an effective diameter of the first spherical face is different from that of the second spherical face so that numerical apertures for the focal points differ.

30. An objective lens for reading out an optical disk by using a light source, having a first surface facing the optical disk and a second surface facing toward the light source, comprising; a first aspherical face formed on the second surface and specified by a curvature radius and an aspherical coefficient, a second aspherical face formed on the second surface and specified by a curvature radius and an aspherical coefficient which are different from those of the first aspherical face, and a spherical face formed on the first surface and specified by a curvature radius, wherein the first and second aspherical faces and the spherical face are adapted in such a way that the objective lens has at least two different focal points.

31. An objective lens of claim 30, wherein the first and second aspherical faces are radially formed.

32. An objective lens of claim 30, wherein the first and second aspherical faces are annularly formed.

33. An objective lens of claim 30, wherein the area of the first aspherical face is equal to that of the second aspherical face.

34. An objective lens of claim 30, wherein the area of the first aspherical face is different from that of the second aspherical face.

35. An objective lens of claim 30, wherein the curvature radius of the spherical face is larger than each of curvature radii of the first and second aspherical faces.

36. An objective lens of claim 31, wherein an effective diameter of the first aspherical face is different from that of the second aspherical face so that numerical apertures for the focal points differ.

37. An objective lens for reading out an optical disk by using a light source, having a first surface facing the optical disk and a second surface facing toward the light source, comprising; a first spherical face formed on the first surface and specified by a curvature radius, a second spherical face formed on the first surface and specified by a curvature radius which is different from that of the first spherical face, a first aspherical face formed on the second surface and specified by a curvature radius and an aspherical coefficient, and a second aspherical face formed on the second surface and specified by a curvature radius and an aspherical coefficient which are different from those of the first aspherical face, wherein the first and second spherical faces and the first and second aspherical faces are adapted in such a way that the objective lens has at least two focal points.

38. An objective lens of claim 37, wherein the first and second spherical faces and the first and second aspherical faces are radially formed.

39. An objective lens of claim 37, wherein the first and second spherical faces and the first and second aspherical faces are annularly formed.

40. An objective lens of claim 37, wherein the area of the first spherical face is equal to that of the second spherical face, and the area of the first aspherical face is equal to that of the second aspherical face.

41. An objective lens of claim 37, wherein the area of the first spherical face is different from that of the second spherical face, and the area of the first aspherical face is different form that of the second aspherical face.

42. An objective lens of claim 37, wherein the curvature radii of the first and second spherical faces are each larger than each of curvature radii of the first and second aspherical faces.

43. An objective lens of claim 38, wherein an effective diameter of the first spherical face is different from that of the second spherical face so that numerical apertures for the focal points differ.

44. An objective lens for reading out an optical disk by using a light source, having a first surface facing the optical disk and a second surface facing toward the light source, comprising; a first aspherical face formed on the first surface and specified by a curvature radius and an aspherical coefficient, a second aspherical face formed on the first surface and specified by a curvature radius and an aspherical coefficient which are different from those of the first aspherical face, and a spherical face formed on the second surface and specified by a curvature radius, wherein the first and second aspherical faces and the spherical faces are adapted in such a way that the objective lens has at least two different focal points.

45. An objective lens of claim 44, wherein the first and second aspherical faces are radially formed.

46. An objective lens of claim 44, wherein the first and second aspherical faces are annularly formed.

47. An objective lens of claim 44, wherein the area of the first aspherical face is equal to that of the second aspherical face.

48. An objective lens of claim 44, wherein the area of the first aspherical face is different from that of the second aspherical face.

49. An objective lens of claim 44, wherein the curvature radii of the first and second aspherical faces are each larger than the curvature radius of the spherical face.

50. An objective lens of claim 45, wherein an effective diameter of the first aspherical face is different from that of the second aspherical face so that numerical apertures for the focal points differ.

51. An objective lens for reading out an optical disk by using a light source, having a first surface facing the optical disk and a second surface facing toward the light source, comprising; a first spherical face formed on the second surface and specified by a curvature radius, a second spherical face formed on the second surface and specified by a curvature radius which is different from that of the first spherical face, and an aspherical face formed on the first surface and specified by a curvature radius and an aspherical coefficient, wherein the first and second spherical faces and the aspherical face are adapted in such a way that the objective lens has at least two different focal points.

52. An objective lens of claim 51, wherein the first and second spherical faces are radially formed.

53. An objective lens of claim 51, wherein the first and second spherical faces are annularly formed.

54. An objective lens of claim 51, wherein the area of the first spherical face is equal to that of the second spherical face.

55. An objective lens of claim 51, wherein the area of the first spherical face is different from that of the second spherical face.

56. An objective lens of claim 51, wherein the curvature radius of the aspherical face is larger than each of curvature radii of the first and second spherical faces.

57. An objective lens of claim 52, wherein an effective diameter of the first spherical face is different from that of the second spherical face so that numerical apertures for the focal points differ.

58. An objective lens for reading out an optical disk by using a light source, having a first surface facing the optical disk and a second surface facing toward the light source, comprising; a first aspherical face formed on the first surface and specified by a curvature radius and an aspherical coefficient, a second aspherical face formed on the first surface and specified by a curvature radius and an aspherical coefficient which are different from those of the first aspherical face, a first spherical face formed on the second surface and specified by a curvature radius, and a second spherical face formed on the second surface and specified by a curvature radius which is different from that of the first spherical face, wherein the first and second spherical faces and the first and second aspherical faces are adapted in such a way that the objective lens has at least two focal points.

59. An objective lens of claim 58, wherein the first and second spherical faces and the first and second aspherical faces are radially formed.

60. An objective lens of claim 58, wherein the first and second spherical faces and the first and second aspherical faces are annularly formed.

61. An objective lens of claim 58, wherein the area of the first spherical face is equal to that of the second spherical face, and the area of the first aspherical face is equal to that of the second aspherical face.

62. An objective lens of claim 58, wherein the area of the first spherical face is different from that of the second spherical face, and the area of the first aspherical face is different form that of the second aspherical face.

63. An objective lens of claim 58, wherein the curvature radii of the first and second aspherical faces are each larger than each of curvature radii of the first and second spherical faces.

64. An objective lens of claim 59, wherein an effective diameter of the first spherical face is different from that of the second spherical face so that numerical apertures for the focal points differ.

65. An optical pickup for reading out an optical media, comprising:

a light source for generating a light beam;

an objective lens for focusing the light beam onto the optical media, the objective lens having a first surface facing the optical disk and a second surface facing toward the light source, the objective lens including a first face formed on the first surface, a second face formed on the second surface, and a third face formed on one of the first and second surfaces, wherein the first, second, and third faces are adapted in such a way that the objective lens has at least two different focal points with respect to the light beam, and a detector for detecting a signal reflected from the optical media.

66. An optical pickup of claim 65, further comprising; a converging lens for converging the signal onto the detecting means.

67. An optical pickup of claim 66, further comprising; a partially reflecting mirror for reflecting the light beam and transmitting the signal beam.

68. An objective lens for reading out an optical disk by using a light source, the objective lens having a first surface facing the optical disk and a second surface facing toward the light source, the objective lens comprising; a first face formed on the first surface, a second face formed on the second surface, and a third face formed on one of the first and second surfaces, wherein the first, second, and third faces are adapted in such a way that the objective lens has at least two different focal points.

* * * * *